(12) United States Patent
Korpusik et al.

(10) Patent No.: US 10,817,509 B2
(45) Date of Patent: Oct. 27, 2020

(54) SYSTEM AND METHOD FOR SEMANTIC MAPPING OF NATURAL LANGUAGE INPUT TO DATABASE ENTRIES VIA CONVOLUTIONAL NEURAL NETWORKS

(71) Applicant: Massachusetts Institute of Technology, Cambridge, MA (US)

(72) Inventors: Mandy Barrett Korpusik, Cambridge, MA (US); James R. Glass, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 280 days.

(21) Appl. No.: 15/922,394

(22) Filed: Mar. 15, 2018

(65) Prior Publication Data

US 2018/0268023 A1    Sep. 20, 2018

Related U.S. Application Data

(60) Provisional application No. 62/472,312, filed on Mar. 16, 2017.

(51) Int. Cl.
*G06F 16/242* (2019.01)
*G06N 3/04* (2006.01)
(Continued)

(52) U.S. Cl.
CPC ...... *G06F 16/243* (2019.01); *G06F 16/24578* (2019.01); *G06F 16/284* (2019.01);
(Continued)

(58) Field of Classification Search
CPC ............... G06F 16/243; G06F 16/284; G06F 16/24578; G06F 40/30; G06N 3/0454;
(Continued)

(56) References Cited

U.S. PATENT DOCUMENTS 6,006,221 A * 12/1999 Liddy ................. G06F 16/3337
9,659,248 B1 * 5/2017 Barbosa ................. G06F 40/40
(Continued)

OTHER PUBLICATIONS

Wang, Peng, et al., "Semantic expansion using word embedding clustering and convolutional neural network for improving short text classification", Neurocomputing, vol. 174, Part B, Jan. 22, 2016, pp. 806-814.*

(Continued)

*Primary Examiner* — Robert Stevens
(74) *Attorney, Agent, or Firm* — Peter A. Nieves; Sheehan Phinney Bass & Green PA

(57) ABSTRACT

A system for associating a string of natural language with items in a relational database includes a first subsystem having a pre-trained first artificial neural network configured to apply a semantic tag selected from a predefined set of semantic labels to a segment of a plurality of tokens representing the string of natural language. A second subsystem includes a second artificial neural network configured to convert the plurality of labeled tokens into a first multi-dimensional vector representing the string of natural language. A third subsystem is configured to rank the first multi-dimensional vector against a second multi-dimensional vector representing a plurality of items in the relational database.

19 Claims, 6 Drawing Sheets

(51) Int. Cl.
  *G06N 5/04* (2006.01)
  *G06F 16/28* (2019.01)
  *G06F 16/2457* (2019.01)
  *G06N 3/08* (2006.01)
  *G06N 5/02* (2006.01)
  *G06F 40/30* (2020.01)
(52) U.S. Cl.
  CPC ............ *G06F 40/30* (2020.01); *G06N 3/0445* (2013.01); *G06N 3/0454* (2013.01); *G06N 3/08* (2013.01); *G06N 5/022* (2013.01); *G06N 5/046* (2013.01)
(58) Field of Classification Search
  CPC ........ G06N 3/08; G06N 3/0445; G06N 5/046; G06N 5/022
  USPC ........................................................ 707/780
  See application file for complete search history.

(56) References Cited

U.S. PATENT DOCUMENTS

| | | | | |
|---|---|---|---|---|
| 9,830,315 | B1* | 11/2017 | Xiao | G06F 40/30 |
| 10,115,055 | B2* | 10/2018 | Weiss | G06F 40/30 |
| 10,354,009 | B2* | 7/2019 | Liang | G06F 16/35 |
| 10,453,099 | B2* | 10/2019 | Korpusik | G06Q 30/0269 |
| 10,534,863 | B2* | 1/2020 | Song | G06F 40/284 |
| 10,545,956 | B2* | 1/2020 | Perkins | G06F 40/30 |
| 10,679,008 | B2* | 6/2020 | Dubey | G06F 40/30 |
| 2014/0236577 | A1* | 8/2014 | Malon | G06F 40/30 704/9 |
| 2015/0331936 | A1* | 11/2015 | Alqadah | G06F 40/40 707/739 |
| 2016/0092434 | A1* | 3/2016 | Bellegarda | G06F 40/58 704/9 |
| 2018/0052823 | A1* | 2/2018 | Scally | G06F 16/3344 |
| 2018/0121787 | A1* | 5/2018 | Hashimoto | G06N 3/0445 |
| 2018/0121788 | A1* | 5/2018 | Hashimoto | G06N 3/08 |
| 2018/0121799 | A1* | 5/2018 | Hashimoto | G06F 40/216 |
| 2018/0157664 | A1* | 6/2018 | Howell | G06F 40/20 |
| 2018/0173698 | A1* | 6/2018 | Dubey | G06F 16/3347 |
| 2018/0267976 | A1* | 9/2018 | Bordawekar | G06F 16/3347 |
| 2018/0267977 | A1* | 9/2018 | Bandyopadhyay | G06N 20/00 |

OTHER PUBLICATIONS

Zeng, Daojian, et al., "Relational Classification via Convolutional Deep Neural Network", COLING 2014, Dublin, Ireland, Aug. 23-29, 2014, pp. 2335-2344.*
Fonseca, Erick R., et al., "A Two-Step Convolutional Neural Network Approach for Semantic Role Labeling", IJCNN 2013, Dallas, TX, Aug. 4-9, 2013, pp. 1-7.*
Korpusik, Mandy, et al., "Distributional Semantics for Understanding Spoken Meal Descriptions", ICASSP 2016, Shanghai, China, Mar. 20-25, 2016, pp. 6070-6074.*
De Boom, Cedric, et al., "Representation learning for very short texts using weighted word embedding aggregation", Pattern Recognition Letters, vol. 80, Sep. 1, 2016, pp. 150-156.*
"Artificial neural network", Wikipedia, downloaded from: en.wikipedia.org/wiki/Artificial_neural_network on Feb. 17, 2020, pp. 1-16.*
"Convolutional neural network", Wikipedia, downloaded from: en.wikipedia.org/wiki/Convolutional_neural_network on Feb. 17, 2020, pp. 1-18.*
O'Shea, Keiron, et al., "An Introduction to Convolutional Networks", arXiv: 1511.08458v2, arXiv.org, Cornell University, Ithaca, NY, Dec. 2, 2015, 11 pages.*
Y. Wang and M. Beydoun, "The Obesity Epidemic in the United States—gender, age, socioeconomic, racial/ethnic and geographic characteristics: A Systematic review and meta-regression analysis." Epidemiologic reviews, vol. 29, No. 1, 24 pages.
C. Ogden, et al "Prevalance of childhood and adult obesity in the United States, 2011-2012", Jama vol. 311 No. 8, 2014, 14 pages.
E. Finkelstein, et al "Annual medical spending attributable to obesity: Payer and service-specific estimates," Health affairs, vol. 28, No. 5, pp. w822-w831, 2009.
J. Ingber, "My fitness pal: A guide to an accessible fitness tool," 2014, 10 pages.
M. Korpusik, et al, "Semantic mapping of natural language input to database entries via convolution neural networks," Proceedings of IEEE Conference on Acoustic, Speech and Signal Processing, (ICASSP), 2016, 5 pages.
Y. Kim, "Convolutional neural networks for sentence classification," arXiv preprint arXiv: 1408.5882, 2014, 6 pages.
A. Conneau et al "Very deep convolutional networks for natural language processing," arXiv preprint arXiv 1606.01781, 2016, 9 pages.
Y. Xiao et al "Efficient character-level document classification by combining convolution and recurrent layers," arXiv preprint arXiv 1602:07018, 2016, 10 pages.
L. Pang, et al "Text matching as image recognition," 2016, 7 pages.
Z. Wang, et al, "Sentence similarity learning by lexical decomposition and composition," arXiv preprint arXiv: 1602.07019, 2016, 10 pages.
B. Hu et al, "Convolutional neural network architectures for matching natural language sentences," in Proceedings of Advances in neural information processing systems (NIPS), 2014, 9 pages.
W. Yin et al "ABCNN" Attention-based convolutional neural network for modeling sentence pairs, arXiv preprint arXiv: 1512.05193, 2015, 14 pages.
W. Yin et al "Attention-based convolutional neural network for machine comprehension," arXiv preprint arXiv: 1602.04341, 2016, 7 pages.
C. Santos et al "Learning character-level representations for part-of-speech tagging", in Proceedings of the 31st International Conference on Machine Learning (ICML) 2014, 9 pages.
Y. Kim et al, "Character-aware neural language models," arXiv preprint arXiv: 1508.06615, 2015, 9 pages.
X. Zhang et al "Character-level convultional networks for text classification," in Proceedings of Advances in neural information processing systems (NIPS) 2015, 9 pages.
N. Srivastava et al "Dropout—A simple way to prevent neural networks from overfitting," Journal of Machine Learning Research, vol. 15, No. 1, pp. 1929-1958, 2014.
S Ioffe et al "Batch normalization: Accelerating deep network training by reducing internal covariate shift," arXiv preprint arXiv: 1502-03167, 2015, 12 pages.
D. Kingma et al, "A method for stochastic optimization", arXiv preprint arXiv: 1412.6980, 2014, 15 pages.
M. Korpusik et al, "Spoken language understanding for a nutrition dialogue system", IEEE Transactions on Audio, Speech and Language Processing, IEEE/ACM Transactions on Audio, Speech, and Language Processing, vol. 25, No. 7, Jul. 2017, 12 pages.
A. Marzal et al "Computation of normalized edit distance and applications," IEEE transactions on pattern analysis and machine intelligence, vol. 15, No. 9 pp. 926-932, 2015.
R. Srivasatava et al, "Highway networks," arXiv preprint arXiv: 1505.00387, 2015, 6 pages.
R. Nephtal, "Natural language processing based nutritional application," Master's thesis, Massachusetts Institute of Technology, 2016, 68 pages.
E. Tuan, "Configuration and evaluation of a constrained nutrtion dialogue system," Master's thesis, Massachusetts Institute of Technology, 2016, 80 pages.
L. Van der Maaten et al "Visualizing data using i-SNE," Journal of Machine Learning Research, vol. 9, No. 2579-2605, 2008, 27 pages.
Adi et al, "Fine-grained analysis of sentence embeddings using auxiliary prediction tasks," Published as a conference paper at ICLR 2017 Feb. 2017, 13 pages.
Mikolov et al, "Efficient estimation of word representations in vector space," arXiv:1301.3781v3 [cs.CL] Sep. 7, 2013, 12 pages.
Li et al, "A hierarchical neural autoencoder for paragraphs and documents," comarXiv: 1506.01057v2 [cs.CL] Jun. 6, 2015, 10 pages.

(56) References Cited

OTHER PUBLICATIONS

Kiros et al, "Skip-thought vectors", Proc. NIPS 2015, 9 pages.
Korpusik, et al "Data collection and language understanding of food descriptions," Proceedings of 2014 IEEE Spoken Language Technology Workshop, 6 pages.
Hermann, et al: "Multilingual Models for Compositional Distributed Semantics", arXiv: 1404.461v1 Apr. 17, 2014, 11 pages.
Harwath, et al, "Unsupervised Learning of Spoken Language with Visual Context", 30th Conference on Neural Information Processing Systems, (NIPS 2016) Barcelona, Spain, 9 pages.
Karpathy, et al, "Deep Visual-Semantic Alignments for Generating Image Descriptions", Computer Vision Foundation, 2015, 10 pages.
Weston et al: "Scaling Up to Large Vocabulary Image Annotation" Proceedings of the Twenty-Second International Joint Conference on Artificial Intelligence, 2011, 7 pages.
Korpusik, et al "Distributional Semantics for Understanding Spoken Meal Descriptions", ICASSP 2016, 5 pages.

\* cited by examiner

US 10,817,509 B2

SYSTEM AND METHOD FOR SEMANTIC MAPPING OF NATURAL LANGUAGE INPUT TO DATABASE ENTRIES VIA CONVOLUTIONAL NEURAL NETWORKS

CROSS-REFERENCE TO RELATED APPLICATIONS

This application claims the benefit of U.S. Provisional Patent Application Ser. No. 62/472,312, filed Mar. 16, 2017, entitled "Semantic Mapping of Natural Language Input to Database Entries via Convolutional Neural Networks," which is incorporated by reference herein in its entirety.

FIELD OF THE INVENTION

The present invention relates to text processing, and more particularly, is directed to relating natural language to database entries.

BACKGROUND OF THE INVENTION

Adult obesity increased from 13% to 32% between the 1960s and 2004, and presently more than one-third of American adults (i.e., 78.6 million) are obese, leading to an estimated medical cost of $147 billion in 2008. Although food journaling is a useful tool for weight loss, existing diet tracking applications such as MyFitnessPal may be too time-consuming for many users, involving manually entering each eaten food by hand and selecting the correct item from a long list of entries in the nutrient database.

Researchers in the natural language processing community have explored convolutional neural networks (CNNs) for processing text. There have been some improvements in question answering using deep CNN models for text classification, following the success of deep CNNs for computer vision. In other work, parallel CNNs have predicted the similarity of two input sentences by computing a word similarity matrix between the two sentences as input to a CNN.

Work has also been done with character-based models. Character-based long short-term memory networks (LSTMs) have been used in neural machine translation for handling out of vocabulary (OOV) words, and sub-word units (called "wordpieces") have performed better than character-based or word-based models for translation. Character-based and word-based embeddings have been combined into joint embeddings for state-of-the-art part-of-speech tagging, which requires syntactic information.

For semantic tagging, a conditional random field (CRF) tagger has not performed well. Further, the performance of a system using n-best decoding with a finite state transducer to directly map from natural language input to the best database entries without intermediate steps has been inadequate in some situations. Therefore, there is a need in the industry to address one or more of these issues.

SUMMARY OF THE INVENTION

Embodiments of the present invention provide semantic mapping of natural language input to database entries via convolutional neural networks. Briefly described, the present invention is directed to a system for associating a string of natural language with items in a relational database. A first subsystem having a pre-trained first artificial neural network is configured to apply a semantic tag selected from a predefined set of semantic labels to a segment of a plurality of tokens representing the string of natural language. A second subsystem includes a second artificial neural network configured to convert the plurality of labeled tokens into a first multi-dimensional vector representing the string of natural language. A third subsystem is configured to rank the first multi-dimensional vector against a second multi-dimensional vector representing a plurality of items in the relational database.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
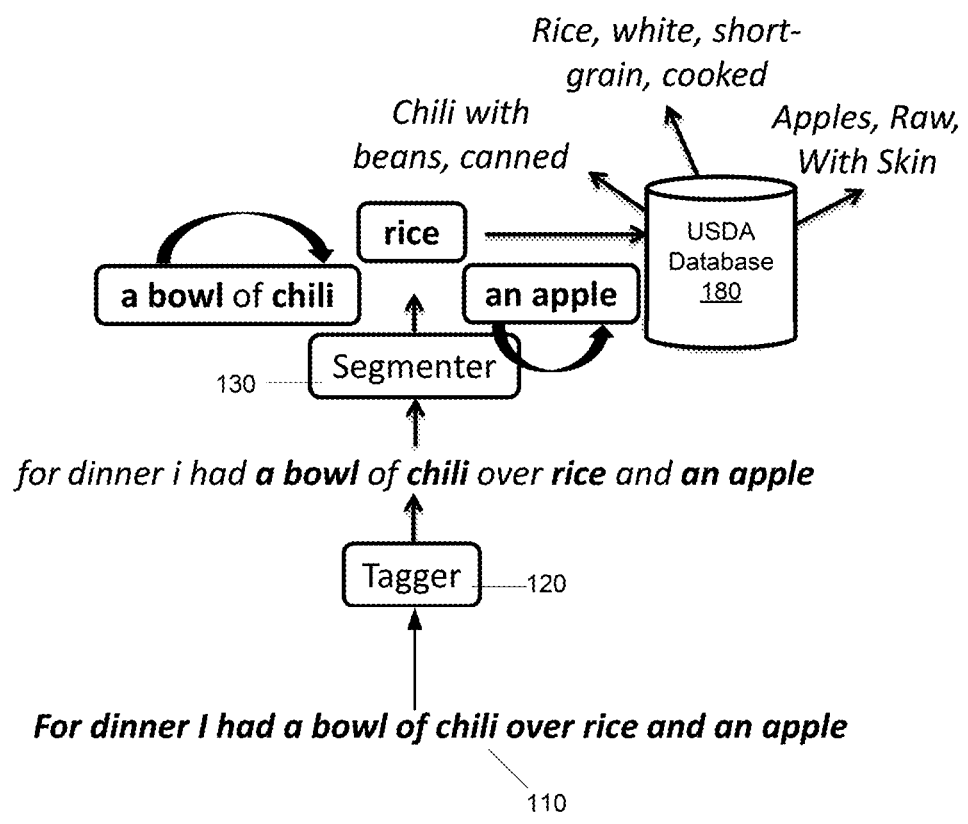
FIG. 1 is a schematic diagram showing a prior art pipeline composed of a conditional random field (CRF) for tagging food and property segments in a text meal description, a random forest classifier for associating foods with properties (e.g., quantities and brands), and database lookup to find the corresponding food database matches.

The following definitions are useful for interpreting terms applied to features of the embodiments disclosed herein, and are meant only to define elements within the disclosure.

As used within this disclosure, a token refers to a data structure characterizing a portion of a text string. Similarly, "tokenizing" refers to receiving a text string and providing a set of associated tokens to words, phrases, or a portion of a word or phrase. A token may be associated with one or more labels indicating a property, via a process referred to as "tagging" and/or "semantic tagging." Tokens related according to a property may be grouped to form a "segment."

As used within this disclosure, "embedding" generally refers to the process of creating an embedded vector representation of a text string. It should be noted that "word embedding" refers to an embedded vector representation of a single word or token (which embodiments described below may learn in the first layer of a first neural network and/or a second neural network with text input), while phrase embedding refers to an embedded vector representation of a phrase or sequence of tokens (which embodiments described below may implement via a second neural network). "Character embedding" refers to an embedded vector representation of a single character.

Reference will now be made in detail to embodiments of the present invention, examples of which are illustrated in the accompanying drawings. Wherever possible, the same reference numbers are used in the drawings and the description to refer to the same or like parts.

An exemplary application for embodiments described herein may provide a diet tracking option for obesity patients by applying speech and language understanding technology to automatically detect food entities in a received text string and produce an output indicating the corresponding nutrition facts from a relational database containing food (nutrient) data. While the exemplary embodiments are generally described with reference to the diet tracking application, a person having ordinary skill in the art will recognize the language processing approach is applicable to many different applications.

The exemplary application outperforms previous applications, shown by FIG. 1 which explored a pipeline for mapping between a text meal description 110 and the corresponding food database matches by first tagging foods and properties with a conditional random field (CRF) tagger 120, followed by food-property association with a segmenter 130, and subsequently using heuristics to map foods to the nutrient database 180.

Figure 2:
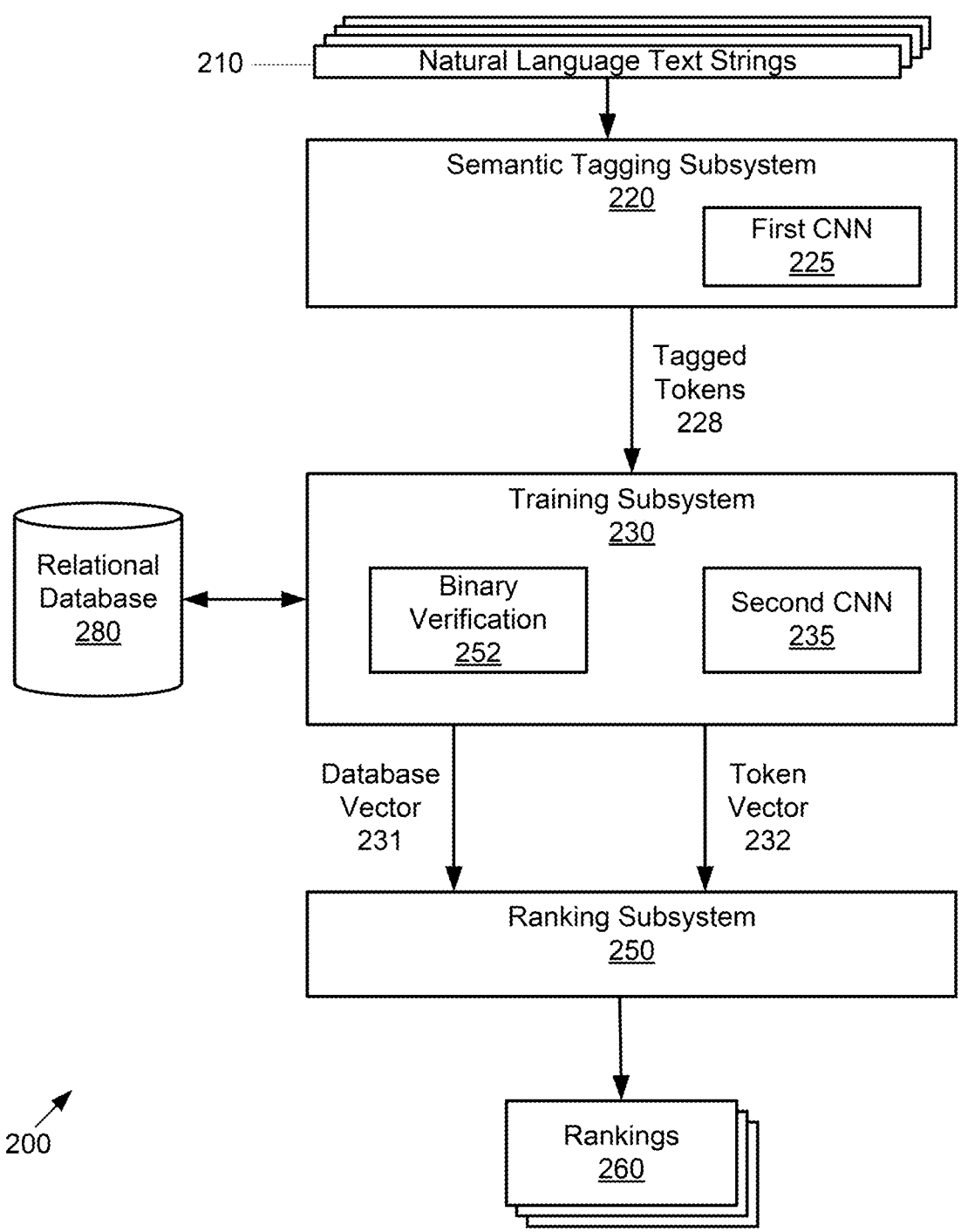
FIG. 2 is a schematic diagram of a first embodiment of an exemplary system for associating natural language text strings with text entries in a relational database.

FIG. 2 is a schematic diagram of an exemplary embodiment of a system 200 for providing a ranking of natural language text strings to a relational database. A semantic tagging subsystem 220 receives one or more natural language text strings 210, for example, text string describing a meal. The semantic tagging subsystem 220 produces a plurality of tagged tokens 228. The semantic tagging subsystem 220 uses a first CNN 225 instead of a CRF, as used in previous systems (see FIG. 1). Although CRFs are a powerful discriminative classifier for sequential tagging problems, they generally involve manual feature engineering. In contrast the first CNN 225 may not involve any feature engineering. In particular, the first CNN 225 may learn filters that apply one dimensional (1D) convolutions to sequences of words in the natural language text strings 210. For example, a CNN window of 5 tokens may be interpreted as an n-gram of 5 tokens, which directly provides context similar to the features used in a CRF.

For the semantic tagging task the first CNN 225 employs a model composed of a word embedding layer initialized uniformly with a plurality of dimensions, for example between 50 and 300 dimensions, followed by a number of CNN layers, for example, 3 layers (with windows of width 5, 5, and 3 tokens, respectively), and finally a fully-connected layer with a softmax activation to predict the semantic tag where the final softmax layer performs a normalized exponential, to produce an output probability between 0 and 1 for each of the possible semantic tags. The semantic tagging subsystem may employ, for example, an Adam optimizer (or others, such as standard stochastic gradient descent, RMSprop, Adagrad, and Adadelta), binary cross-entropy loss (or other losses, such as categorical cross-entropy or mean squared error), and dropout (of values between 0.1 and 0.5, for example) with early stopping to prevent overfitting. The first CNN 255 may be preferable to the LSTM due to faster training and fewer parameters.

A training subsystem 230 receives the plurality of tagged tokens 228 and uses a second CNN 235 (for example, a character-based CNN) to perform phrase embedding to produce a multi-dimensional token vector 232. The training subsystem 230 may also perform phrase embedding for the relational database 280 to produce a database vector 232. In alternative embodiments, the database vector 231 based on the relational database 280 may be pre-trained, and/or produced externally to the system 200. A binary verification module 252 is configured to predict whether an item from the relational database 280 represented in the database vector 231 is mentioned in the natural language string 210 represented by the token vector 232. While the first embodiment employs a binary verification module 252, alternative embodiments may use different verification techniques.

A ranking subsystem 250 may receive the database vector 231 and the token vector 232 as inputs. The ranking subsystem 250 is configured to perform a dot product between each of the plurality of pre-trained item vectors 231 and each of the plurality of semantically tagged segments in the text description of items in the token vector 233, to produce a plurality of rankings 260 indicating a strength of a correlation between each item in the relational database 280 represented by the database vector 231 and a corresponding item in the natural language string 210 represented by the token vector 232.

The first embodiment addresses shortcomings of previous solutions, for example, handling a misspelled food or brand in a meal description, and handling a new food that was not present in the training data. To handle these cases, the first embodiment employs the character-based second CNN 235 that learns character embeddings for each character in a tagged token 228, rather than only at the word level. Thus, with a character model, out-of-vocabulary (OOV) words are represented as character sequences and can be used to predict matching foods with similar characters, while the previous word-based approach (see FIG. 1) would not be able to handle such OOV words.

Under the first embodiment, the semantic tagging subsystem 220 and the training subsystem 230 each train a neural network model that learns phrase embeddings for relational database 280 items through the binary verification module 252 that determines whether or not the item in the relational database 280 is referenced in the natural language text strings 210. The ranking subsystem 250 ranks all the possible relational database 280 hits to determine the top ranked matches, wherein a "hit" refers to a likely reference to an item in the relational database by the natural language strings 210. The semantic tagging subsystem 220 and the training subsystem 230 may not have information about which tagged tokens map to which relational database items (i.e., food segments are not labeled), so the ranking subsystem 250 learns this relation automatically through the binary verification module 252.

Figure 3:
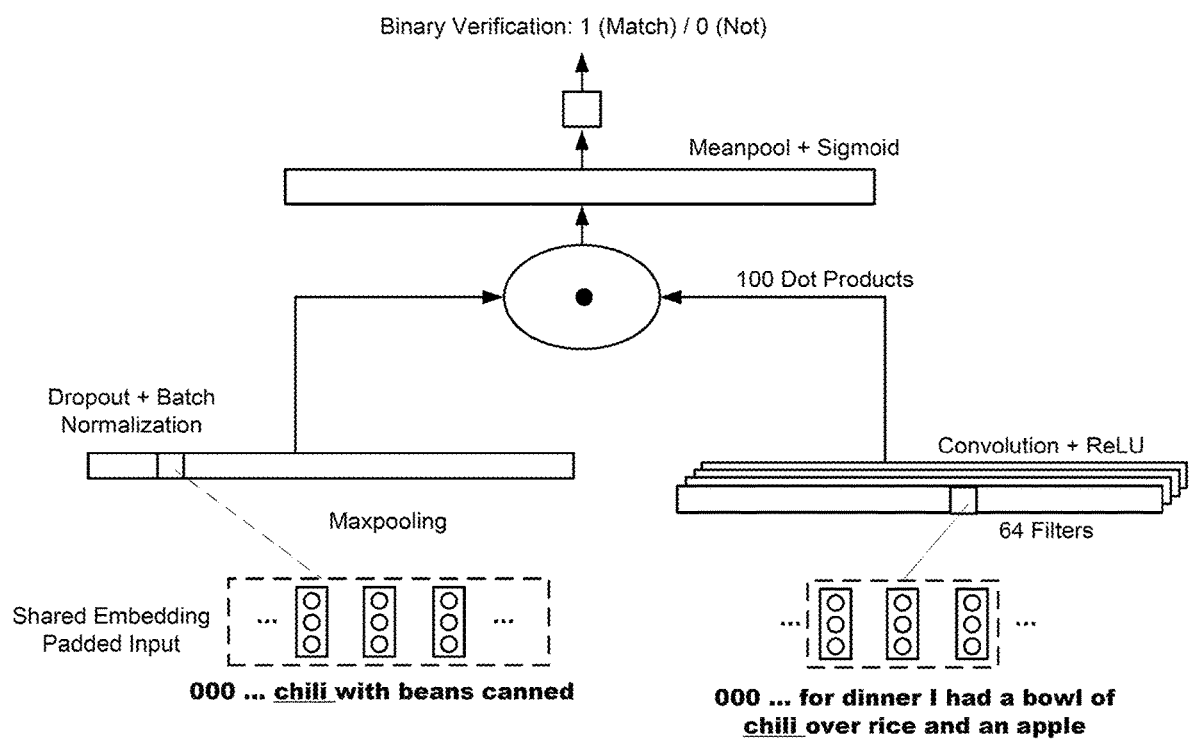
FIG. 3 is a schematic diagram detailing a method for predicting whether a USDA food entry is mentioned in a meal description.
Figure 4:
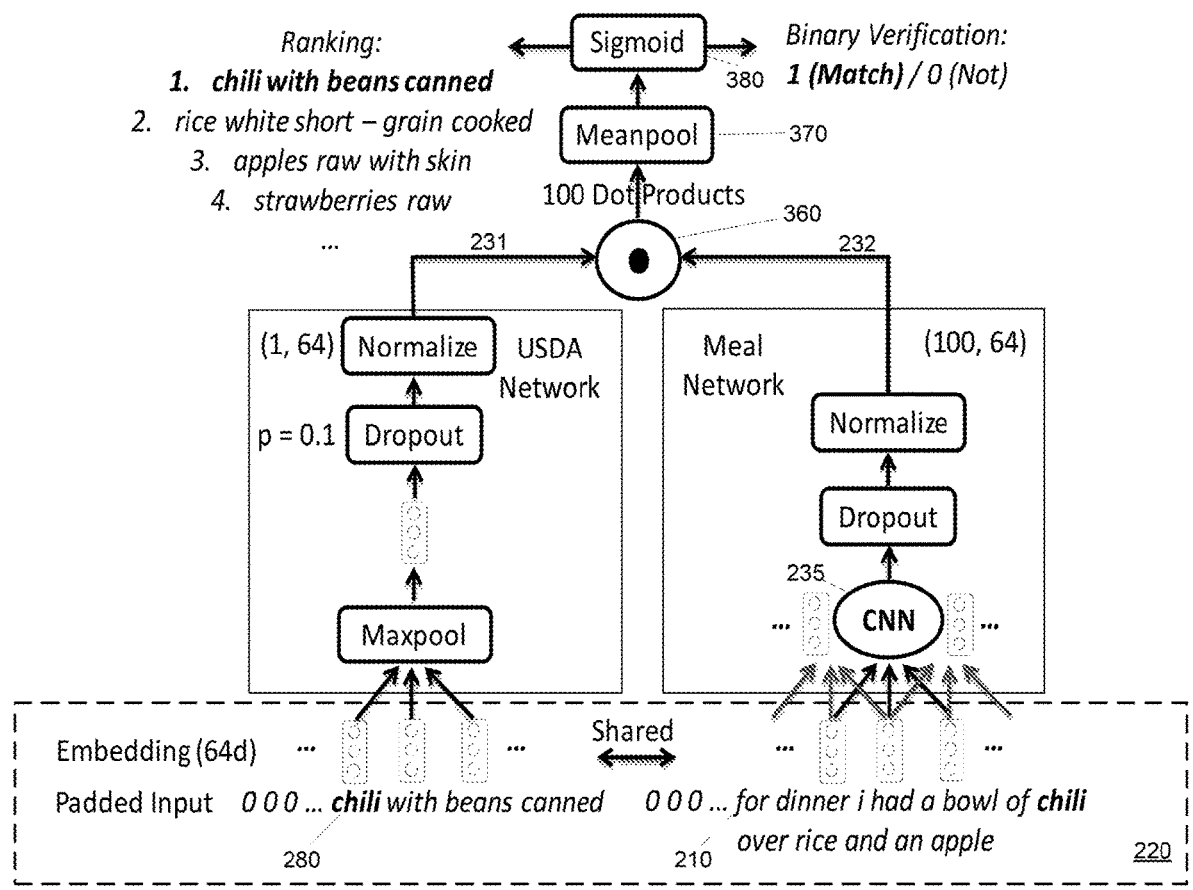
FIG. 4 is a schematic diagram of an exemplary method embodiment performed by the system of FIG. 2.

As shown in FIGS. 3-4, the semantic tagging subsystem 220 employs a shared multi-dimensional word embedding layer, for example, a 64-dimension word embedding layer, followed by one convolution layer above the embedded meal description 210 and max-pooling over the embedded USDA input 280. The text may be tokenized, for example, using spaCy (https://spacy.io), or another such tokenizing method. The second CNN 235 computes a 1D convolution of 64 filters spanning a window of three tokens with a rectified linear unit (ReLU) activation. During training, both the input of the USDA max-pooling (i.e., taking the maximum value across all USDA tokens, for each dimension in its 64-dimension word embedding layer) and the convolution by the second CNN 235 over the meal description are followed by dropout of probability 0.1, for example, and batch normalization (i.e., a layer in the neural network which scales and shifts its input so that its output is normalized, maintaining a mean near zero and a standard deviation close to one). A dot product 360 is performed between the max-pooled 64-dimension USDA vector and each 64-dimension output of the meal description by the binary verification module 252. Mean-pooling 370 across these dot products 360 (in this case, simply averaging, since the input to this layer is just 100 dot product values) may yield a single scalar value, followed by a sigmoid layer 380 for final prediction.

To prepare the data for training, input text string may be padded, for example, padded to 100 tokens, and the vocabulary of the relational database 280 may be limited, for example, to the most frequent 3,000 words, setting the rest to UNK (i.e., "unknown") which helps the model learn how to handle unknown words at test time that it has never seen during training. The training subsystem 230 may predict each (USDA food, meal) input pair as a match or not (1 or 0) with a threshold, for example, of 0.5 on the output.

As shown by FIGS. 3 and 4 with reference to FIG. 2, while the binary verification module 252 predicts whether or not a USDA food entry in the relational database 280 is mentioned in one or more of the natural language text strings 210, it does not directly retrieve the matching USDA foods in the relational database 280 from one or more of the natural language text strings 210. To make predictions, the ranking subsystem 250 ranks all the USDA food entries in the relational database 280, and returns likely matches, for example, the top-5 matches, to the user. The most intuitive approach is to rank all USDA foods simply based on the posterior probability (i.e., softmax value) output by the model, but this may not provide the top-5 alternatives for each matching food in the meal described by the natural language text strings 210, since the match is based on similarity with the entire meal description and may not distinguish which USDA hits match which eaten foods.

The semantic tagging subsystem 220 performs semantic tagging on tokens for the meal description in the natural language text strings 210 with a pre-trained first CNN tagger 225, which labels tokens from a predefined set of labels, for example, Begin-Food, Inside-Food, Quantity, and Other. The semantic tagging subsystem 220 feeds the meal description in the form of tagged tokens 228 to a training subsystem 230 to generate phrase embeddings (vectors) for each token. The ranking subsystem 250 averages the vectors 231, 232 for tokens in each tagged food segment (i.e., consecutive tokens labeled Begin-Food and Inside-Food), and computes the dot products between these food segments and each USDA food vector, for example, each previously computed and stored USDA food vector. The dot products are used to rank the USDA foods in two steps: a fast-pass ranking followed by fine-grained re-ranking that weights important tokens more heavily. For example, simple ranking would yield generic milk as the top hit for 2% milk, whereas re-ranking focuses on the property 2% and correctly identifies 2% milk as the top USDA match.

After the initial ranking of USDA foods using dot products between database vectors 231 (USDA vectors) and token vectors 232 (food segment vectors), a second fine-grained pass re-ranks the top passes, for example, the top-30 hits with a weighted distance D shown by Eq. 1.

$$D = \sum_i \alpha_i \max_j (w_i \cdot w_j) + \sum_j \beta_j \max_i (w_i \cdot w_j) \quad \text{(Eq. 1)}$$

where the left-hand term finds the most similar meal description token $w_j$ to each USDA token $w_i$, weighted by the probability $\alpha_i$ that token was used to describe the USDA food item in the training data. In the same way, the right-hand term finds the most similar USDA token $w_i$ to each meal token $w_j$, weighted by the probability $\beta_i$ that token $w_j$ was used to describe that USDA food item in the training data (see an example in Table 1).

TABLE 1

| j = 0 chili | $\beta_6 + \alpha_0$<br>i = 0 chili | $\alpha_1$(chili · with)<br>i = 1 with | $\alpha_2$(chili · beans)<br>i = 2 beans | $\alpha_3$(chili · canned)<br>i = 3 canned |
|---|---|---|---|---|

Qualitative analysis shows that the neural network (NN) model is indeed learning meaningful vector representations of the USDA food entries, which is why it performs so well on ranking the matching USDA foods in a meal description. For example, the nearest neighbor to three USDA foods (see Table 2) using Euclidean distance indicates that the neighbors are semantically similar.

TABLE 2

Nearest foods to three USDA learned food vectors. {tc "6 Nearest 101 foods to three USDA learned food vectors."\f t}

| USDA Food | Nearest USDA Food |
|---|---|
| Rice white short-grain . . . | . . . Mexican Spanish Rice |
| Fast Foods Chicken Tenders | Chicken Broiler or Fryers . . . |
| Beans Baked Canned . . . | Beans Black Mature . . . |

Figure 6:
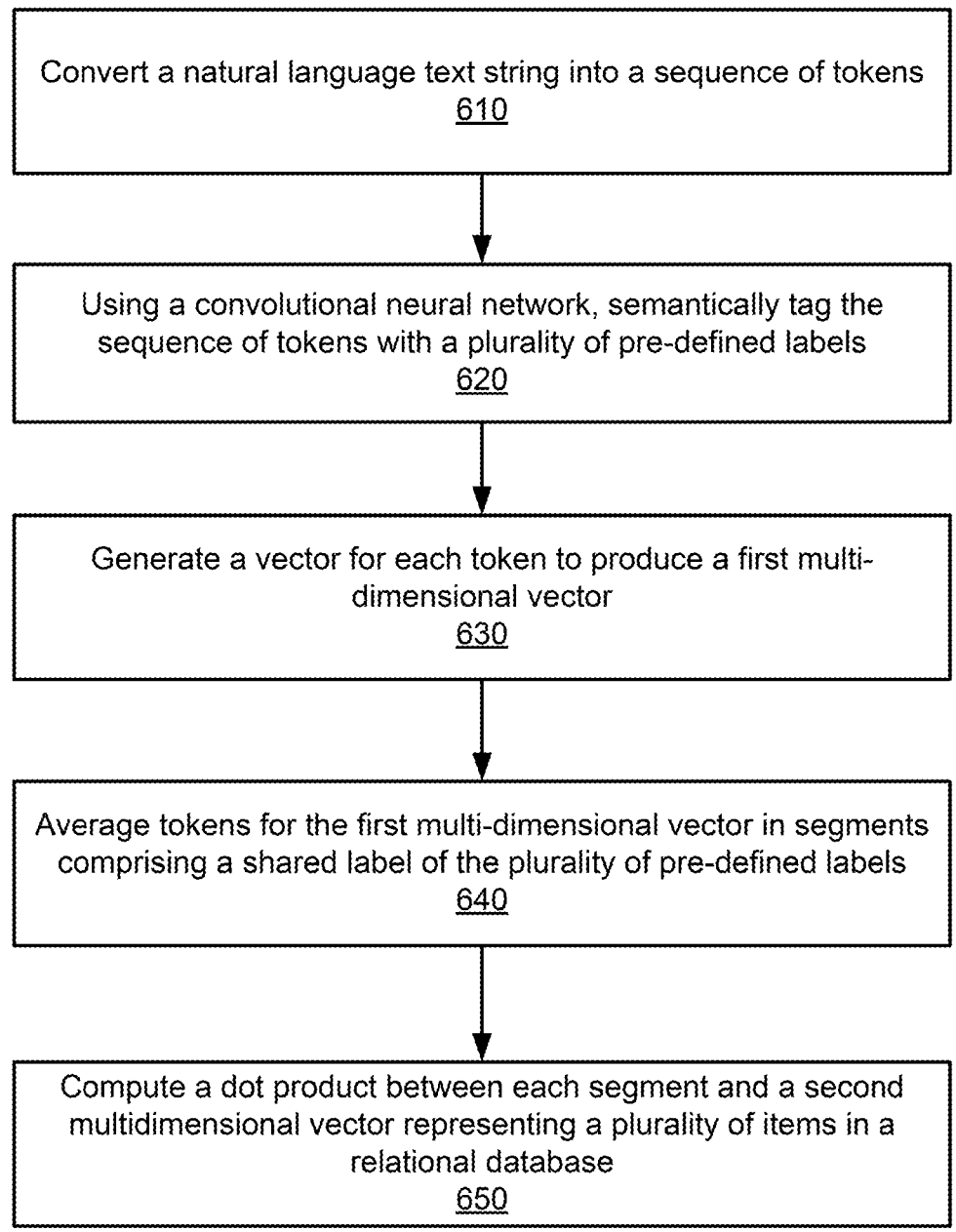
FIG. 6 is a flowchart of an embodiment for a method for ranking a text string against items in a relational database.

FIG. 6 is a flowchart of an embodiment for a method for ranking a text string against items in a relational database. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A natural language text string is converted into a sequence of tokens, as shown by block 610. The sequence of tokens is semantically tagged with a plurality of pre-defined labels using a convolutional neural network, as shown by block 620. A vector is generated for each token to produce a first multi-dimensional vector, as shown by block 630. Tokens for the first multi-dimensional vector are averaged in segments comprising a shared label of the plurality of pre-defined labels, as shown by block 640. A dot product is computed between each segment and a second multi-dimensional vector representing a plurality of items in a relational database, as shown by block 650.

Figure 5:
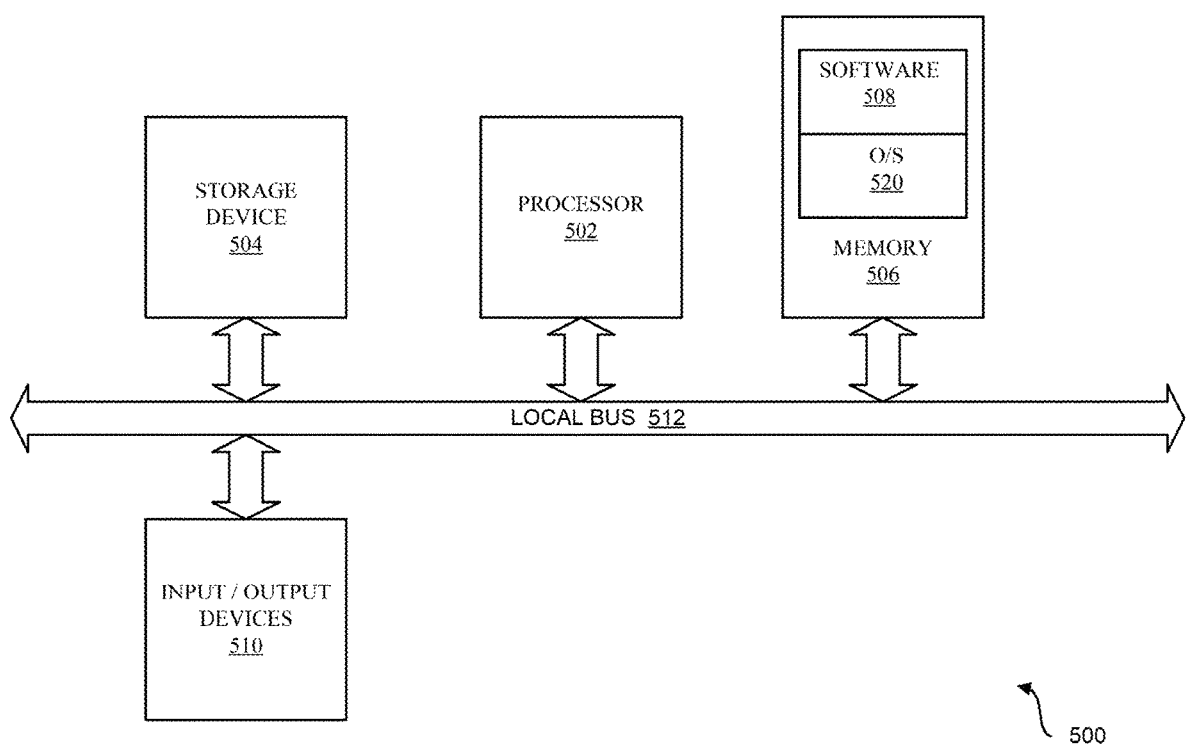
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. For example, while the embodiments describe a CNN, alternative embodiments may employ other artificial neural networks. In view of the foregoing, it is intended that the present invention cover modifications and variations of this invention provided they fall within the scope of the following claims and their equivalents.

What is claimed is:

1. A system for applying speech and language understanding technology to automatically detect entities in a received natural language text string related to data in a relational database and producing an output comprising data from the relational database corresponding to the detected entities, comprising:

a first subsystem comprising a pre-trained first artificial neural network configured to apply a semantic tag selected from a predefined set of semantic labels to a segment comprising a plurality of tokens representing the natural language text string;

a second subsystem comprising a second artificial neural network configured to convert the plurality of labeled tokens into a first multi-dimensional vector representing the natural language text string; and a third subsystem configured to rank the first multi-dimensional vector against a second multi-dimensional vector representing a plurality of items in the relational database.

2. The system of claim 1, wherein the second subsystem is further configured to predict whether an item represented in the second multi-dimensional vector is present in the first multi-dimensional vector.

3. The system of claim 2, wherein the second subsystem is configured to average the first multi-dimensional vector for tokens tagged with a semantic label.

4. The system of claim 3, wherein the third subsystem is configured to compute a dot product between the first multi-dimensional vector and the second multi-dimensional vector.

5. The system of claim 1, wherein the natural language comprises a description of a meal.

6. The system of claim 1, wherein each of the plurality of items in the relational database refers to a food item.

7. The system of claim 1, wherein the first and/or second artificial neural network comprises a convolutional neural network.

8. A computer based method for applying speech and language understanding technology to automatically detect entities in a received natural language text string related to data in a relational database and producing an output comprising data from the relational database corresponding to the detected entities, comprising the steps of:

converting the text string to a plurality of tokens;

semantically tagging the plurality of tokens with a plurality of pre-defined labels;

generating a vector for each token to produce a first multi-dimensional vector;

averaging tokens for the first multi-dimensional vector in segments comprising a shared label of the plurality of pre-defined labels; and computing a dot product between each segment and a second multi-dimensional vector, wherein the tagging is performed using a convolutional neural network.

9. The method of claim 1, further comprising the step of predicting whether an item represented in the second multi-dimensional vector is present in the first multi-dimensional vector.

10. The method of claim 9, wherein the second multi-dimensional vector represents a plurality of items in the relational database.

11. The method of claim 10, wherein the text string comprises natural language.

12. The method of claim 11, wherein the text string comprises a description of a meal.

13. The method of claim 12, wherein each of the plurality of items in the relational database refers to a food item.

14. A device for applying speech and language understanding technology to automatically detect entities in a received natural language text string related to data in a relational database and producing an output comprising data from the relational database corresponding to the detected entities, comprising:

a processor and a memory configured to store non-transient instructions that when executed by the processor, perform the steps of:

receiving a word embedding comprising a plurality of semantic tags selected from a predefined set of semantic labels applied to a segment comprising a plurality of tokens representing the string of natural language; and providing an artificial neural network configured to convert the word embedding into a multi-dimensional vector representing the string of natural language.

15. The device of claim 14, further comprising the step of predicting whether an item represented in a second multi-dimensional vector representing a plurality of items in the relational database is present in the first multi-dimensional vector.

16. The device of claim 15, wherein the second subsystem is configured to average the first multi-dimensional vector for tokens tagged with a semantic label.

17. The device of claim 15, wherein each of the plurality of items in the relational database refers to a food item.

18. The device of claim 14, wherein the natural language comprises a description of a meal.

19. The device of claim 14, wherein the artificial neural network comprises a convolutional neural network.

* * * * *